Jan. 12, 1943.     F. E. FEHR     2,307,735
TEAR TAPE
Filed Aug. 21, 1941

Inventor
Frank E. Fehr
By
Attorney

Patented Jan. 12, 1943

2,307,735

UNITED STATES PATENT OFFICE 2,307,735

TEAR TAPE

Frank E. Fehr, Akron, Ohio, assignor to Wingfoot Corporation, Wilmington, Del., a corporation of Delaware Application August 21, 1941, Serial No. 407,707

1 Claim. (Cl. 229—51)

This invention relates to a tear tape to be used in opening packages, particularly packages made of an elastoplastic which is unoriented, such as a cast film of rubber hydrochloride, cellulose ethers and esters, polyvinyl acetate, chlorideacetate, etc. The fact that unoriented film does not tear in any regular fashion makes it impossible to use the ordinary tear tapes with them. The tear tapes of the present invention tear longitudinally and by uniting them to unoriented film the film is made to tear in a desired direction.

The tear tape of this invention is a composite strip which comprises three or more threads united by an elastoplastic. It is preferably placed under the wrapper, but it may be adhered to the outside of it.

The invention will be further described in connection with the accompanying drawing in which.

Figure 1:
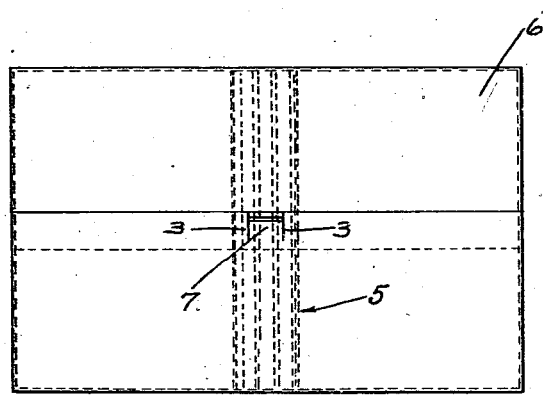
Fig. 1 is a plan view of a package provided with the tear tape.

The invention will be described in connection with a tear tape of rubber hydrochloride film used with a package enclosed in Pliofilm (rubber hydrochloride film), although it is not limited thereto.

The tear tape may for example be the tape known as Filmtex which is manufactured by The Filmtex Products Company of Cuyahoga Falls, Ohio. Such a tape is illustrated in the drawing. It comprises four threads 1 which give the desired tensile strength to the product. These are incorporated in a flat tape by folding a flat strip of Pliofilm 2 over them and uniting the overlapping areas of film. This union may be effected by heat and pressure, or by the use of an adhesive. The threads need not be united to the film, but by treating the threads with a suitable adhesive they may be so united. The film may be ordinary cast rubber hydrochloride film, such as film about one-thousandth of an inch thick, or it may be a stretched film, produced by heating the cast film and stretching it to several hundred per cent of its original length.

Figure 3:
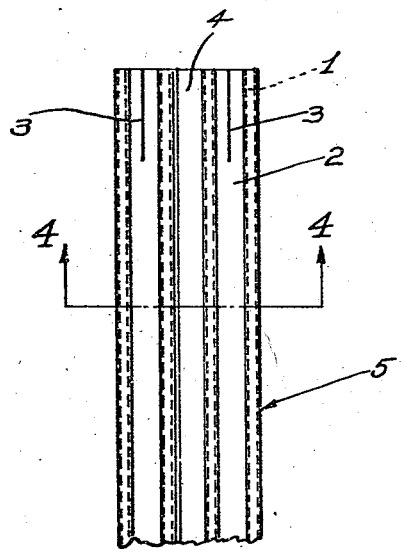
Fig. 3 is an enlarged plan view of the tear tape.
Figure 4:
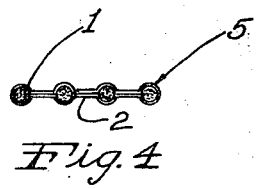
Fig. 4 is a section on the line 4—4 of Fig. 3.

Pliofilm is rather difficult to tear, except that when a tear has been started it is not difficult to continue it. It will be noted that the tape in Fig. 3 is slit at one end on opposite sides of the two central threads along the lines 3, 3. By grasping the portion 4 thus separated from the side sections of the tape the film tears easily. The outside threads guide the tear. As the tab 4 is raised the film will continue to tear on each side between the two outside threads.

Cast films, such as Pliofilm, do not tear along a straight line. By fastening the tear tape of this invention to a Pliofilm wrapper, preferably underneath it, the tearing of the wrapper is guided by the tear of the tape. It is thus possible by such a tape to remove a relatively narrow strip of film from a wrapper.

Figure 2:
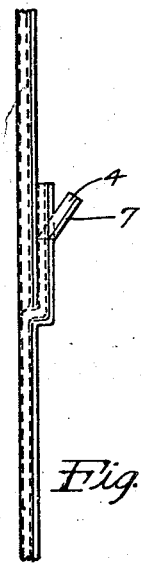
Fig. 2 is an enlarged cross section of the tear tape and wrapper of Fig. 1.

In Figs. 1 and 2 the tear tape is indicated by the reference numeral 5. It is wrapped around the package under the wrapper 6. It is fastened to the wrapper by heat and pressure or by a suitable adhesive. The edge of the wrapper is preferably cut along the lines 3, 3 at the same time the tape is slit along these lines. The slits 3 in the wrapper thus coincide with the slits 3 in the tape. The tab 4 of the tape thus coincides with the tab 7 of the wrapper to which it is united, or the tab 4 may extend out from under the wrapper in which case the wrapper need not be slit.

The overlapping plies of the wrapper are united by heat-sealing them together over the area indicated by stippling.

When it is desired to open the package one grasps the tab 4, 7 and pulls it away from the package. The threads guide the tear made in the tear tape and as the tear tape is united to the wrapper the wrapper tears along the same lines as the tape. In this way a narrow band of the tape and wrapper is removed all around the package, and then the balance of the wrapper, with the two outside edges of the tape united to it, may be easily slipped from the package.

What I claim is:

In a package comprising a wrapper of rubber hydrochloride film a tear tape of rubber hydrochloride united to the wrapper which tape is formed with at least three guide threads running lengthwise thereof, one end of the tape being exposed and slit lengthwise a short distance to form a tab which includes the end of at least one of said threads between edges of the tape which also each include at least one of said threads.

FRANK E. FEHR.